United States Patent
Pan et al.

(10) Patent No.: US 9,828,653 B2
(45) Date of Patent: *Nov. 28, 2017

(54) METHOD FOR RECYCLING LEAD OXIDE-CONTAINING WASTE MATERIAL

(71) Applicants: CHILWEE POWER CO. LTD, Zhicheng, Changxing (CN); BEIJING UNIVERSITY OF CHEMICAL TECHNOLOGY, ChaoYang District, Beijing (CN)

(72) Inventors: Junqing Pan, Changxing (CN); Xiaowei Liu, Changxing (CN); Yanzhi Sun, Changxing (CN); Yongquan Ma, Changxing (CN); Yinjian Niu, Changxing (CN); Tixian Chen, Changxing (CN); Xuan Zhang, Changxing (CN); Xiaoxiang Cai, Changxing (CN); Shuang Song, Changxing (CN); Mingming Zhou, Changxing (CN); Longrui Zhou, Changxing (CN); Guoqing Cao, Changxing (CN); Xinxin Yang, Changxing (CN); Jianglin Wang, Changxing (CN); Xin Wu, Changxing (CN)

(73) Assignee: CHILWEE POWER CO. LTD & BEIJING UNIVERSITY OF CHEMICAL TECHNOLOGY (CN)

( * ) Notice: Subject to any disclaimer, the term of this patent is extended or adjusted under 35 U.S.C. 154(b) by 59 days.

This patent is subject to a terminal disclaimer.

(21) Appl. No.: 14/906,366

(22) PCT Filed: May 27, 2014

(86) PCT No.: PCT/CN2014/078491
§ 371 (c)(1),
(2) Date: Jan. 20, 2016

(87) PCT Pub. No.: WO2015/123931
PCT Pub. Date: Aug. 27, 2015

(65) Prior Publication Data
US 2016/0160315 A1   Jun. 9, 2016

(30) Foreign Application Priority Data
Feb. 21, 2014   (CN) .......................... 2014 1 0060146

(51) Int. Cl.
*C22B 13/00* (2006.01)
*C22B 3/00* (2006.01)
*C22B 7/00* (2006.01)

(52) U.S. Cl.
CPC ............ *C22B 13/045* (2013.01); *C22B 7/006* (2013.01); *Y02P 10/234* (2015.11)

(58) Field of Classification Search
CPC ...... C22B 13/045; C22B 7/006; H01M 10/54; Y02P 10/234; Y02W 30/84

USPC .............................................. 423/92; 429/49
See application file for complete search history.

(56) References Cited

U.S. PATENT DOCUMENTS

| | | | | |
|---|---|---|---|---|
| 7,507,496 | B1 * | 3/2009 | Kinsbursky | C01G 21/06 29/2 |
| 8,562,923 | B1 * | 10/2013 | Smith | C22B 13/045 423/619 |
| 2006/0018819 | A1 | 1/2006 | Olper et al. | |

FOREIGN PATENT DOCUMENTS

| | | | |
|---|---|---|---|
| CN | 102618884 | A | 8/2012 |
| CN | 102820496 | A | 12/2012 |
| CN | 102925698 | * | 2/2013 |
| CN | 103014347 | A | 4/2013 |
| CN | 103146923 | A | 6/2013 |
| CN | 103290225 | A | 9/2013 |
| CN | 103374657 | A | 10/2013 |
| CN | 103374658 | A | 10/2013 |
| CN | 103468970 | A | 12/2013 |
| CN | 103509949 | * | 1/2014 |
| CN | 103523820 | * | 1/2014 |
| WO | 2014038745 | A1 | 3/2014 |

OTHER PUBLICATIONS

Guo et al., "Review of hydrometallurgical processes for recovering lead from scrap lead-acid batteries", Journal of Donngguan University of Technology, vol. 13, No. 1, Feb. 2006.*

Junqing Pan, Yanzhi Sun, Wei Li, James Knight, Arumugam Manthiram, A green lead hydrometallurgical process based on a hydrogen-lead oxide fuel cell., Jul. 19, 2003, pp. 1-6, Nature Communications 4:2178 doi: 10.1038/ncomms3178, Macmillan Publishers Limited.

* cited by examiner

*Primary Examiner* — Steven Bos
(74) *Attorney, Agent, or Firm* — Maine Cernota & Rardin

(57) ABSTRACT

Provided is a method for recycling a lead oxide-containing waste material, comprising: (1) contacting the lead oxide-containing waste material with a desulphurizer under desulphurization reaction conditions, and performing a solid-liquid separation on the mixture after contacting to obtain a filtrate and a filtration residue; (2) performing a conversion reaction on the above-mentioned filtration residue at a temperature of 350-750° C. so as to convert the lead-containing components in the filtration residue into lead oxide; (3) contacting the product obtained from step (2) with an alkaline solution so as to dissolve the PbO therein, and then performing a solid-liquid separation to obtain a PbO-alkaline solution; and (4) crystallizing the PbO-alkaline solution from step (3) to obtain PbO crystals and an alkaline filtrate. The method can reduce the energy consumption.

18 Claims, No Drawings

METHOD FOR RECYCLING LEAD OXIDE-CONTAINING WASTE MATERIAL

RELATED APPLICATIONS

This application is a national phase application filed under 35 USC §371 of PCT Application No. PCT/CN2014/078491 with an International filing date of 27 May 2014, which claims priority to Chinese Patent Application No. CN201410060146.5, filed 21 Feb. 2014. Each of these applications is herein incorporated by reference in their entirety for all purposes.

FIELD OF THE INVENTION

The present invention relates to a method for recovering lead oxide from lead oxide-containing wastes.

BACKGROUND OF THE INVENTION

Since lead-acid batteries were invented by Plante, a French Engineer in the middle of the nineteenth century, lead-acid batteries have been widely used as cheap and reliable secondary batteries in automobile, electric vehicle, energy storage, and other fields. According to the latest statistics, though lead-acid batteries confront keen competition from Li-ion batteries and Ni—H batteries in the secondary battery market, lead-acid batteries have been taking 65.2% of market share, equivalent to USD39.294 billion in the secondary battery market owing to their unique safety performance and high cost-performance ratio. According to the statistical data from the International Lead and Zinc batteries Study Group, in 2012, the lead consumption in the world was 10.62 million tons, about 82% of which was used for producing lead-acid batteries. According to the statistical data from China Nonferrous Metals Industry Association, in 2012, the total consumption of lead in China was 4.646 million tons, in which 3.3 million tons were used to produce lead-acid batteries. In year 2012, as the last original lead mine smelting enterprise was closed and only 15 secondary lead smelting enterprises were kept in USA, facing the huge lead-acid battery demand, it is believed that waste and worn lead-acid batteries will be a major mineral asset in the society and will be increasingly used as the principal raw material for lead smelting.

The existing lead recovery process essentially belongs to pyrometallurgy of lead. Usually, the lead in lead-acid batteries mainly includes lead alloy in the plate grids and conducting tabs and lead paste in the negative electrode and positive electrode. Since lead paste contains Pb (10-15 wt %), PbO (10-20 wt %), $PbO_2$ (25-35 wt %), and $PbSO_4$ (30-45 wt %), lead recovery from lead paste becomes the focus in the entire lead recovery process. Automatic lead-acid battery crushing and separation equipment from Engitee (an Italia company) in combination with a device for pre-desulphurization with sodium carbonate and a device for absorbing sulfur dioxide in tail gas with sodium carbonate solution are utilized by modern pyrometallurgy enterprises, and sulfur dioxide emission in the smelting process are significantly reduced. Representative enterprises include Henan Yuguang Gold & Lead Co., Ltd., Hubei Jinyang Metallurgical Incorporated Co., Ltd., and Zhejiang Tianneng Group, etc. Though modern pyrometallurgy enables large-scale continuous production and is matured in technology, it involves pyrolytic smelting of lead-containing materials at 1100-1300° C., which not only brings a problem of high energy consumption, but also produces lead vapor resulted from inevitable volatilization at a high temperature, lead-containing dust in particle size equal to or smaller than PM2.5 and lead-containing waste residue and flue ash in the smelting process; consequently, the lead recovery rate is usually 95-97%.

To overcome the drawback of high energy consumption and lead emission in pyrometallurgy of lead, hydrometallurgy of lead is employed and regarded as a cleaner next-generation lead recovery process. Existing secondary lead hydrometallurgy processes, represented by hydrofluosilicic acid lead electrolysis, are unacceptable in industrial production owing to their high processing cost incurred by complex lead paste treatment process, high power consumption as high as 700-1,000 kWh/ton lead, and environmental pollution and equipment corrosion resulted from the fluorine-containing solution. A new $H_2$—PbO fuel cell process reported by a research group led by Panjunqing eliminates the demand for electrolysis in the existing hydrometallurgy process and absorbs the advantages of fuel cell and redox flow cell. In that process, PbO is dissolved in alkaline NaOH solution, high-purity Pb is recovered in the form of $H_2$—PbO self-power generation, and the energy consumption and electrolysis cost in the lead recovery process are greatly reduced, and the lead recovery cost is lower than the cost of existing pyrometallurgy process (Nature Communications, 2013, 4, 2178:1-6). Though it is expected that the cost of future industrial hydrometallurgy process of lead recovery will be lower than the cost of lead pyrometallurgy, we are still considering whether the existing lead recovery concept is appropriate. Through analysis of the entire history from the first time of lead smelting thousands of years ago to the modern $H_2$—PbO fuel cell process, it is found that the metallic lead concept for lead recovery has been followed in the large-scale lead recovery field; in contrast, the main modern lead customers have turned from conventional lead letter casting, lead cables, acid-proof lead storage tanks, and lead-acid batteries to the lead-acid battery market increasingly. For lead-acid battery manufacturers, the active material in lead-acid batteries is lead oxide, and only some refined lead is required to produce alloy plate grids (e.g. Pb—Ca plate grids). Hence, while lead smelting enterprises consume huge energy to smelt lead-containing materials (e.g., lead oxide) into crude lead and then electrolyze the crude lead into refined lead, their major customers—lead-acid battery manufacturers buy refined leads, melt the refined lead and cast into lead balls, and finally oxidize the lead balls into lead oxide by ball milling and use the lead oxide as an active material in lead-acid batteries. It can be seen that the lead smelting enterprises have produced a large quantity of refined lead according to the traditional concept and accordingly result in huge energy consumption and severe environmental pollution in that process, without taking consideration of the actual demand of their main customers—lead-acid battery manufacturers. Hence, the conventional lead pyrometallurgy industry must change the traditional lead smelting concept that involves high energy consumption and severe pollution to a new concept of directly producing lead oxide. For waste and worn lead-acid batteries, how to seek for an effective method to effectively convert the four components (Pb, PbO, $PbSO_4$, and $PbO_2$) in waste lead paste into pure PbO is a difficult task in the lead oxide regeneration process. As disclosed in existing patent literatures, some research groups have tried to prepare lead oxide from waste lead paste. For example, in CN103374657A, a raw material (e.g., sodium carbonate) and waste lead paste have a desulphurization reaction, then the desulphurized lead paste has a reaction with citric acid solution; next, through filtering, washing, and drying procedures, lead citrate is obtained; finally, the lead citrate is calcined to obtain super-fine lead oxide. Though the target product in that invention is PbO, raw chemical materials such as citric acid, hydrogen peroxide, and sodium carbonate, etc. are consumed heavily. Therefore, that approach is uneconomical when viewed from the aspect of atom utilization; in addition, that process can't separate impurities (e.g., barium sulfate) originally included in the waste lead paste. In CN103374658A, a method for preparing super-fine lead oxide from desulphurized lead paste through a three-stage process is disclosed, comprising: step (1): dissolving lead paste that has been desulphurized with sodium carbonate and pre-reduced with hydrogen peroxide in nitric acid or acetic acid; step (2) controlling the acidic lead-containing solution to have a reaction with sodium carbonate to obtain lead carbonate; step (3): producing super-fine lead oxide that contains PbO, $Pb_3O_4$, or a mixture of them from lead carbonate by calcination. Apparently, the process is mainly a conventional process that consumes raw chemical materials. A large quantity of raw chemical materials, including hydrogen peroxide, nitric acid, and sodium carbonate, etc. are consumed in the lead recovery process.

Similarly, in CN102820496A, a process is disclosed. In that process, the lead paste obtained from waste lead-acid batteries reacts with acetic acid and $H_2O_2$ under a stirring condition, and then the mixture is filtered to obtain lead acetate crystals. Finally, the lead acetate crystals are calcined at a high temperature for 2-3 h, to obtain PbO powder.

As described above, existing lead oxide recovery processes reported up to now mainly comprise the following three procedures: (1) lead paste pre-reduction and pre-desulphurization; (2) convert the pretreated lead paste into a lead salt such as lead acetate or lead citrate, etc. by means of acetic acid, citric acid, or oxalic acid; (3) obtain lead oxide from the lead salt (lead acetate or lead citrate, etc.) by calcination. Since the target product is PbO, a green lead recovery process should include two parts: first, though the lead sulfate part has to be recovered with a desulfurizing agent, the recovery of other parts (Pb, PbO and $PbO_2$) should not involve addition of any other atom as far as possible; second, an effective lead oxide purification process that is based on an atom-economic approach should be provided.

The research group led by Pan Junqing has made further research for improving economic atom utilization in the lead conversion process, and has disclosed a novel method for utilizing the lead paste in lead-acid batteries in CN103146923A. That method comprises the following five procedures: 1. heating the lead paste in lead-acid battery and lead powder to have a solid-phase mixing reaction; 2. carrying out alkaline desulphurization in NaOH solution A; 3. leaching the desulphurized product with NaOH solution B, to obtain lead-containing alkaline solution and filter residue, and then treating by purification and cooling crystallization to obtain lead oxide; 4. utilizing NaOH solution C to carry out recrystallization to obtain PbO crystals at a higher purity; 5. after desulphurization, adding NaOH in the NaOH solution A to precipitate sodium sulfate crystals; in that approach, a NaOH desulphurization cycle is created, with sodium sulfate as a byproduct. The features of that method include: for the four components of lead paste, firstly, Pb and $PbO_2$ are utilized to directly obtain PbO in solid state, and the excessive $PbO_2$ in the waste lead paste is consumed by adding Pb; secondly, only the $PbSO_4$ in the lead paste is desulphurized to generate PbO and $Na_2SO_4$; finally, NaOH solution is utilized to control the PbO to conduct recrystallization, and thereby purer PbO solid is obtained. That method utilizes an atom-economic reaction between Pb and $PbO_2$ and purifies PbO by recrystallization in NaOH solution. The raw material NaOH, which is mainly consumed, is only used for desulphurization of the $PbSO_4$ in the lead paste. Thus, unlike other processes in which all components in the lead paste are converted into lead salt and then desulphurized, the process disclosed in that patent document exploits a novel lead oxide recovery technique from the aspect of improving economic atom utilization. Through research that lasted almost one year, the main drawbacks of that method become increasingly apparent, mainly including:

1. Long process flow: 5 procedures, including solid-phase reaction at a high temperature, desulphurization with NaOH solution A, leaching with NaOH solution B, recrystallization with NaOH solution C, and NaOH addition for sodium sulfate precipitation, are required. Therefore, it is very necessary to simplify the process and thereby reduce the recovery cost and energy consumption.

2. $PbSO_4$ doesn't participate in the reaction before/after heating, in the high-temperature solid-phase conversion of the lead paste in the first stage. Hence, the $PbSO_4$, which accounts for 30-45 wt % of the total weight of the lead paste, is mingled with Pb and $PbO_2$ and is heated up meaninglessly, resulting in energy waste; in addition, a great deal of lead sulfate included in the lead paste results in incomplete solid-phase reaction between Pb and $PbO_2$, and consequently a part of unreacted Pb or $PbO_2$ particles remain in the product. Hence, in order to improve product quality and recovery rate, it is of particular importance to eliminate the adverse effect of $PbSO_4$ ahead of time.

SUMMARY OF THE INVENTION

The object of the present invention is to provide an innovative method for recovering lead oxide from lead oxide-containing wastes with a short process flow and low energy consumption, which can be used to obtain high-purity PbO and overcome the drawbacks in the existing methods for recovering high-purity lead oxide from lead oxide-containing wastes in the prior art, i.e., long process flow, incomplete reaction, and unreasonable energy consumption.

The present invention provides a method for recovering lead oxide from lead oxide-containing wastes, comprising the following steps:

(1) controlling a lead oxide-containing waste to contact with a desulfurizing agent under desulphurization reaction conditions, and carrying out solid-liquid separation for the mixture obtained from the contact reaction, to obtain filtrate and filter residue;

(2) controlling the filter residue to have a conversion reaction at 350-750° C. temperature, to convert the lead-containing components in the filter residue into lead oxide.

Since the method disclosed in the present invention employs a desulphurization+atom-economic conversion process, it avoids that a major lead-containing component $PbSO_4$ in the lead oxide-containing waste only serves as a heating bearer but doesn't participate in the atom-economic conversion process at a high temperature, which not only increases meaningless heat energy consumption but also results in that the major substances after the reaction are PbO and $PbSO_4$, with some Pb and $PbO_2$ mingled with $PbSO_4$ owing to the existence of $PbSO_4$, and consequently the conversion efficiency of the atom-economic reaction is decreased and desulphurization-leaching-separation-crystallization procedures are required. The advantages of the innovative method include: through a pre-desulphurization procedure, not only the $PbSO_4$ in the lead oxide-containing waste is converted into useful PbO or $Pb(OH)_2$ in the desulphurization procedure, but also the meaningless heat energy consumption of the $SO_4^{2-}$ part is greatly reduced, since $SO_4^{2-}$ is removed greatly.

To meet the demand for PbO in α-structure in the lead-acid battery field, the method disclosed in the present invention further comprises: (3) controlling the product obtained in step (2) to contact with alkaline solution, to dissolve the PbO in the product, and then carrying out solid-liquid separation to obtain PbO-alkaline solution; (4) controlling the PbO-alkaline solution obtained in step (3) to crystallize, to obtain PbO crystals and alkaline filtrate; and, treating the PbO crystals obtained in step (4) by ball milling for crystal transformation, to transform the PbO crystals into high-purity PbO in typical α-structure. Experiments have shown: after the desulphurized lead oxide-containing waste has an atom-economic reaction directly, PbO in typical α-structure of 99.3% or higher purity can be obtained by primary crystallization and crystal transformation. If the step (4) is executed repeatedly, the purity of PbO can be further increased to 99.99% or a higher value.

In addition, in a preferred embodiment according to the present invention, by maintaining the atom-economic conversion process at 420-580° C., the PbO crystal form can be further controlled in the reaction process, so that a higher α-PbO content can be attained. Though the atom-economic reaction can be initiated spontaneously at a lower reaction temperature, the reaction time will be longer and the obtained PbO may be mingled with red $Pb_3O_4$; consequently, the purity of PbO is decreased. Though the reaction speed can be increased significantly at a higher temperature, the content of β-PbO will be too high, a large quantity of lead dust will be produced, and the energy consumption will be high.

By cooling the material after atom-economic conversion at a specific cooling rate, the oxidation effect of oxygen in the air to PbO can be further eliminated in the cooling process. The present invention provides a direct mist cooling method for PbO at a high temperature. Usually, the amount of mist spraying is 0.5-50 wt % of the lead oxide, and the coolant is preferably one or more of water, ethanol, methanol, and acetone.

By adding alkaline solution to the filtrate after desulphurization, sulfate products and an alkaline solution that can be recirculated for desulphurization can be obtained directly. Therefore, with the method for recovering lead oxide from lead oxide-containing materials in the present invention, PbO and sulfate products can be produced together.

Moreover, in a preferred embodiment of the present invention, a wet ball milling process is used in the present invention to implement the stirred desulphurization process in a reactor in step (1). A wet ball milling and desulphurization process has the following advantages:

(1) A single-step ball milling and desulphurization process is employed to overcome a drawback that two procedures (pre-milling and stirred desulphurization in a reactor of lead oxide-containing waste) are required in the prior art. Owing to the fact that the lead oxide-containing waste usually contains sulfuric acid component included in lead-acid battery, 10-50 ppm Fe impurity is often carried into the waste in the mechanical pre-milling procedure in the prior art, which has a direct impact on the quality of the recovered lead oxide powder. Through a ball milling and desulphurization process in alkaline NaOH and/or KOH solution in the innovative process disclosed in the present invention, not only two functions (pre-milling and stirred desulphurization) for the lead oxide-containing waste are directly implemented in one ball-milling reactor, but also the lead-containing mill dust in the mechanical milling process in the prior art is significantly avoided, and thereby an environmental protection effect is attained.

(2) With zirconium balls or agate balls as the abrasive material under an alkaline condition, inclusion of contaminating metals (e.g., Fe) can be effectively prevented, and thereby a process basis for producing high-grade lead oxide is provided.

(3) With a wet ball milling process, the reaction time of the follow-up atom-economic reaction at a high temperature can be shortened, and thereby the production efficiency is improved on one hand, and energy is saved on the other hand. The reason may be: through a wet ball milling process, not only the Pb and $PbO_2$ components in the lead oxide-containing waste are mixed fully, but also a part of Pb and $PbO_2$ have a small quantity of atom-economic reaction and conversion in the ball milling contact process, which is helpful for the follow-up quick and thorough atom-economic reaction and can save the time required for the atom-economic reaction at a high temperature.

DETAILED DESCRIPTION OF THE EMBODIMENTS

Hereunder the present invention will be detailed in some embodiments. It should be appreciated that the embodiments described here are only provided to describe and explain the present invention, but shall not be deemed as constituting any limitation to the present invention.

According to the present invention, a method for recovering lead oxide from lead oxide-containing wastes is provided, comprising the following steps:

(1) controlling a lead oxide-containing waste to contact with a desulfurizing agent under desulphurization reaction conditions, and carrying out solid-liquid separation for the mixture obtained from the contact reaction, to obtain filtrate and filter residue;

(2) controlling the filter residue to have a conversion reaction at 350-750° C. temperature, to convert the lead-containing components in the filter residue into lead oxide;

(3) controlling the product obtained in step (2) to contact with alkaline solution, to dissolve the PbO in the product, and then carrying out solid-liquid separation to obtain PbO-alkaline solution;

(4) controlling the PbO-alkaline solution obtained in step (3) to crystallize, to obtain PbO crystals and alkaline filtrate.

In the method according to the present invention, in step (1), the purpose of controlling the lead oxide-containing waste to contact with a desulfurizing agent is to remove lead sulfate in the lead oxide-containing waste. Therefore, a desulfurizing agent applicable to the present invention can be any known substance that can react with lead sulfate in the lead oxide-containing waste to generate soluble sulfate and sulfur-free lead compounds in the art. The desulfurizing agent is preferably NaOH and/or KOH solution, more preferably NaOH solution.

In the method according to the present invention, in step (1), the process of contact between the lead oxide-containing waste and the desulfurizing agent can be implemented through a conventional desulphurization process in a reactor, or implemented through a wet ball milling process. The inventor of the present invention has found: by controlling the lead oxide-containing waste and the desulfurizing agent (in particular, NaOH and/or KOH solution) to mix and contact in the wet ball milling process, a more homogeneous stirred milling effect can be attained more quickly when compared with the conventional stirred mixing process in a reactor, the yield rate of PbO and the purity of PbO product can be greatly improved subsequently, and the time required for the contact in the follow-up step (1) can be shortened. Therefore, preferably the contact between the lead oxide-containing waste and the desulfurizing agent in the present invention is implemented by means of a wet ball milling and mixing process. The ball milling conditions preferably include: based on 1,000 g lead oxide-containing waste, the mass of the balls is 5-500 g, more preferably 3-300 g, the number of the balls is 5-100, the ball milling time is 0.1-200 min., the ball milling reaction temperature is controlled at −5° C.-105° C., more preferably 10-80° C., wherein, the balls are preferably zirconium balls or agate balls.

Though high-concentration sodium sulfate and/or potassium sulfate solution can be directly obtained from high-concentration alkaline solution (e.g., NaOH and/or KOH solution) after the reaction, it is difficult to fully disperse the lead oxide-containing waste in too little NaOH and/or KOH solution; consequently, the material will be very viscous in the stirring process. Through a large quantity of experiments, it is determined that the concentration of the NaOH and/or KOH solution in the present invention is preferably 4-23 wt %, to maintain an appropriate solid-liquid ratio between the NaOH and/or KOH and the lead oxide-containing waste and appropriate stirring viscosity and obtain mother liquid of sodium sulfate and/or potassium sulfate at appropriate concentration.

In step (1), usually a slightly excessive amount of desulfurizing agent (preferably NaOH and/or KOH solution) is used, and the dosage is equivalent to 101-150% stoichiometric amount of lead sulfate in the lead oxide-containing waste. If the added amount of desulfurizing agent is inadequate, the desulphurization reaction between the $PbSO_4$ and the desulfurizing agent will be incomplete; if the added amount of desulfurizing agent is excessive, the residual desulfurizing agent will cause PbO dissolution and increased Pb content in the filtrate; in addition, excessive desulfurizing agent solution will dilute the sulfate content in the mother liquid and cause decreased recovery rate of sodium sulfate and/or potassium sulfate in the follow-up procedures, or an additional evaporation procedure is required to ensure sodium sulfate and/or potassium sulfate can precipitate sufficiently.

The method according to the present invention is applicable to recover lead oxide from different kinds of lead oxide-containing wastes, as long as the lead oxide-containing waste contains one or more of PbO, Pb, $PbSO_4$, and $PbO_2$. For example, the lead oxide-containing waste can be one or more of lead paste in waste lead-acid batteries, PbO waste obtained from recycled waste pole plates, other lead oxide-containing wastes produced in production of lead-acid batteries, and lead oxide-containing wastes produced in the production in other fields. Preferably, the lead oxide-containing waste is lead paste in waste lead-acid batteries, i.e., waste lead paste. Usually, the waste lead paste contains 10-15 wt % Pb, 10-20 wt % PbO, 25-35 wt % $PbO_2$, and 30-45 wt % $PbSO_4$.

In the method according to the present invention, in step (2), the process is an atom-economic conversion process designed to implement conversion of Pb, $PbO_2$, and PbO—$Pb(OH)_2$ obtained from desulphurization into PbO. The temperature of the conversion reaction in step (2) should be within 350-750° C. range, preferably within 390-620° C. range. The time of the conversion reaction in step (2) can be 3-70 min., preferably 5-40 min.

In the method according to the present invention, the conversion reaction in step (2) preferably is carried out in existence of a promoter for atom-economic reaction. The existence of the promoter for atom-economic reaction can promote the desulphurized lead oxide-containing waste to be converted into PbO quickly and completely. The promoter for atom-economic reaction can be added in step (1) and/or step (2).

In the present invention, the promoter for atom-economic reaction can be any substance that can react with $PbO_2$ to generate PbO, for example, the promoter for atom-economic reaction can be one or more of metal powder, carbon powder, naphthalene, camphor, urea, and active carbon containing 0.5-95 wt % PbO, or a mixture of one or more of the above-mentioned substances and β-lead peroxide mixed at any ratio. For example, the metal powder can be one or more of lead powder, barium powder, aluminum powder, sodium powder, lithium powder, potassium powder, magnesium powder, nickel powder, tin power, stibium powder, and zinc powder. More preferably, the particle diameter of the promoter for atom-economic reaction is controlled at 80-600 meshes.

In a preferred embodiment according to the present invention, the promoter for atom-economic reaction is a mixture of lead powder and β-lead peroxide, and the weight ratio of lead powder to β-lead peroxide is 1:0.05-2. With the preferred promoter for atom-economic reaction, the reaction can be carried out quickly, and the cost is low.

The dosage of the promoter for atom-economic reaction can be selected as required, as long as it ensures that the above-mentioned conversion process can be executed fully. The dosage of the promoter for atom-economic reaction is preferably 0.05-30 wt % of the total weight of the filter residue obtained in step (1), more preferably 1-20 wt %.

Moreover, the inventor of the present invention has found: by cooling the conversion product obtained in step (2) at an appropriate cooling rate, on one hand, the crystal form of the PbO product can be mainly kept as α-structure, on the other hand, PbO oxidation can be prevented. Accordingly, preferably the method provided in the present invention further comprises: cooling the product obtained in step (2) to 100-300° C. within 0.5-30 min, more preferably cooling to 100-150° C. within 1-10 min, before the step (3) is executed. More preferably, the cooling method is liquid mist cooling, so as to obtain a better cooling effect, wherein, the coolant is preferably one or more of water, methanol, ethanol, and acetone. In the liquid mist cooling procedure, the size of the mist droplets is preferably 2-50 μm.

To obtain a high-purity PbO product, the method disclosed in the present invention further comprises the following step (3): controlling the product obtained in step (2) and/or the cooled product to contact with alkaline solution, to dissolve the PbO in the product, and then carrying out solid-liquid separation. The alkaline solution can be either or both of sodium hydroxide solution and potassium hydroxide solution. The concentration of the alkaline liquid can be 12-60 wt %. The dosage of the alkaline solution is determined in a way that the concentration of the product obtained in step (2) in the contact system in step (3) is 30-120 g/L, the contact temperature is 45-135° C., and the contact time is 0.5-100 min. Preferably, the alkaline solution is pre-heated to the above-mentioned contact temperature, and then the alkaline solution contacts with the product obtained in step (2) and/or the cooled product.

In the method according to the present invention, the alkaline solution may have some PbO dissolved in it. Specifically, the alkaline solution may have PbO of 60 g/L or lower content dissolved in it.

More preferably, to accelerate the dissolution of the product obtained in step (2) and/or the cooled product or improve the solubility of the product obtained in step (2) and/or the cooled product in the alkaline solution, the contact between the product obtained in step (2) and/or the cooled product and the alkaline solution is carried out in existence of a dissolution promoter. The dissolution promoter is preferably one or more of ethylene diamine, sodium acetate, sodium tartrate, EDTA, glycerol, butanediol, pentanol, sorbitol, xylitol, histidine, arginine, and glycocoll. The dosage of the dissolution promoter is 0.2-20 wt % of the alkaline solution, preferably 0.5-15 wt %.

In the method according to the present invention, the solid-liquid separation in step (1) and step (3) can be implemented with any solid and liquid separation method known in the art, such as pressure filtration or centrifugal separation. In a preferred embodiment, the solid-liquid separation in step (3) is pressure filtration at 65-120° C. (preferably 70-110° C.). The pressure filtration can be implemented with a LOX filter press, for example.

To obtain PbO solid at higher purity, the method disclosed in the present invention preferably comprises: repeating step (3) to step (4) again or cyclically, i.e., substitute the product obtained in step (2) with the PbO crystal obtained in step (4) and repeat step (3) and step (4) cyclically. In step (4), the crystallization process is cooling crystallization, and PbO crystals and mother liquid after crystallization (i.e., alkaline filtrate) are obtained through the cooling crystallization process. Experiments have shown: through repeated purification, the purity of the PbO crystals usually can be 99.99% or higher.

In general, the preparation of high-purity lead oxide powder consists of two procedures: the PbO crude product is dissolved in alkaline solution, to complete the first stage of dissolution; in the case that the alkaline solution is NaOH solution, the reaction formula can be expressed as follows:

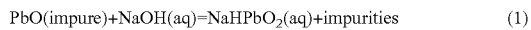

$$PbO(impure) + NaOH(aq) = NaHPbO_2(aq) + impurities \quad (1)$$

To obtain PbO of high-purity, the alkaline solution with PbO dissolved in it should be treated by solid-liquid separation to obtain PbO-containing alkaline solution (i.e., PbO-alkaline solution) and impurity-containing filter residue.

Usually, the filter residue contains 30-50 wt % barium sulfate and 5-10 wt % $Ca(OH)_2$, while the remaining part is PbO. The barium sulfate can be separated from the filter residue through a simple $HClO_4$ or nitric acid dissolution process, and then the barium sulfate can be returned to the negative electrode production process of lead-acid batteries.

After the impurities are removed, the PbO solution should be treated through a crystallization process to obtain PbO crystals and alkaline filtrate. The alkaline filtrate can be used in the dissolution-crystallization process of the PbO crude product repeatedly. In case the alkaline solution is NaOH solution, the reaction formula of the crystallization process can be expressed as follows:

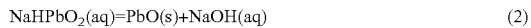

$$NaHPbO_2(aq) = PbO(s) + NaOH(aq) \quad (2)$$

It can be seen that if the PbO after crystallization still contains some impurities, the PbO can be further purified through the dissolution-crystallization process in the alkaline solution.

Under actual PbO crystallization conditions, the nucleation process and the growing process are not completely separated from each other. If the nucleation time is too long, some crystal nuclei will enter into the growing process and begin to grow before the nucleation process is completed; consequently, some bulky grain crystals will produce when the nucleation process is completed, and the alkaline mother liquid may be included in the bulky grain crystals. The nucleation process and the growing process can be deemed as completely separated from each other without interference only if the nucleation rate is much higher than the growing rate. In that case, the obtained crystal grains are mono-dispersed crystal grains, the average size of the crystal grains is very small, and the distribution of the crystal grains is concentrated. To obtain such type of crystal grains, the nucleation rate must be increased as much as possible while the growing rate must be decreased as much as possible, or the growing time must be shortened as far as possible on the premise of ensuring full crystallization. Therefore, with respect to the dissolution process of the PbO crude product, the control of the crystallization process of the PbO solution and the post-treatment of the crystallized product are critical. The crystallization process of PbO has a direct influence on the crystal form and structure of PbO, the size of crystal grain, and the content of impurities introduced by adsorption or crystallization process. Hence, in a preferred embodiment, in step (4), the crystallization process is carried out in stages, including: a first stage of crystallization at 60-135° C. and a second stage of crystallization at −5° C. to 60° C., wherein the duration of the first stage of crystallization is 1-60 min, the duration of the second stage of crystallization is 3-600 min. More preferably, the duration of the first stage of crystallization is 1-60 min, the duration of the second stage of crystallization is 3-600 min.

In another preferred embodiment, the method provided in the present invention further comprises: (5) treating the PbO crystals obtained in step (4) by ball milling for crystal transformation, to obtain PbO in typical α-structure.

The operating conditions of the ball milling for crystal transformation in the present invention may include: based on 1,000 g lead oxide, the mass of the balls is 5-500 g, preferably 3-300 g, the number of the balls is 5-100, the ball milling time is 0.5-200 min, and the temperature of the ball milling for crystal transformation is controlled at 5-550° C., preferably 30-460° C.

The inventor of the present invention has found: in the case that the desulfurizing agent is NaOH solution, by adding denser NaOH solution or solid NaOH into the filtrate obtained in step (1) to increase the concentration of NaOH in the filtrate to 90-150% of the concentration before the contact, the sodium sulfate generated in the desulphurization reaction in step (1) can precipitate directly, and thereby a sodium sulfate product can be obtained through a simple solid-liquid separation procedure, and the filtrate (NaOH solution) can be directly recycled and reused. Hence, preferably, the desulfurizing agent is NaOH solution. Accordingly, the method disclosed in the present invention further comprises: supplementing the desulfurizing agent into the filtrate obtained in step (1), and controlling the concentration of the desulfurizing agent in the filtrate to 90-150% of the concentration before the contact.

With the method provided in the present invention, lead oxide-containing wastes can be converted efficiently into high-purity lead oxide, while the energy consumption can be reduced significantly, the use of any toxic or harmful material in the recovery process and possible secondary pollution thereof can be avoided; in addition, totally enclosed and continuous industrial production can be realized.

Hereunder the present invention will be further detailed in some examples.

Example 1

This example is provided to explain the method for directly recovering lead oxide from waste lead paste of lead-acid batteries used in electric vehicles in the present invention.

Weigh 10 Kg waste lead paste obtained from 12V, 12 Ah waste and worn batteries of electric vehicles. Through analysis, the weight percentages of major components in the waste lead paste are: 20% PbO, 11% Pb, 35% $PbSO_4$, 30% $PbO_2$, 0.35% $BaSO_4$, and 0.2% $SiO_2$, and the remaining part is sulfuric acid solution of 20 wt % concentration. The lead compounds in the 10 Kg waste lead paste are equivalent to 38.39 mol PbO.

The lead oxide recovery process is as follows:
(1) mix the 10 kg waste lead paste with 15 L 8.5 wt % NaOH solution at 20° C., and carry out ball milling (based on 1,000 g waste lead paste, the mass of the balls is 300 g, agate balls are used) for 10 min, and then filter to obtain filtrate and filter residue;
(2) mix the filter residue with 0.1 Kg promoter for atom-economic reaction of 160 meshes (the weight ratio of Pb powder to β-$PbO_2$ is 1:0.5) to a homogeneous state, and heat up the mixture to 460° C. using a temperature programming method with a heating rate of 5° C./min, keep the reaction for 20 min at 460° C. temperature, to enable the reaction to be carried out homogeneously and fully;
(3) cool the product obtained in step (2) by water mist cooling within 0.5 min (the size of water mist droplets is 25 μm) to 150° C., and stop water spraying at that temperature;
(4) control the cooled product obtained in step (3) to contact with 80 L 35 wt % NaOH solution to dissolve the PbO in the product, wherein, to promote the dissolution of the PbO, the NaOH solution is heated up to 120° C., and 1,200 g EDTA is added into the solution. Stir at 100 rpm for 15 min, to enable the PbO obtained in step (3) to be fully dissolved in the NaOH solution;
(5) control the filtrate obtained through solid-liquid separation in step (4) to crystallize for 60 min and 300 min at 80° C. and 5° C. respectively, and carry out solid-liquid separation for the PbO obtained in the two crystallization stages to separate it from the mother liquid, wherein, after the separation, the mother liquid contains 20 g/L PbO, and the NaOH mother liquid that contains the residual PbO can be used in step (4) repeatedly;
(6) treat the PbO crystals obtained in step (5) by ball milling in a ball mill for crystal transformation, wherein, the crystal transformation conditions include: based on 1,000 g lead oxide-containing waste, the mass of the balls is 200 g, the number of the balls is 50, the ball milling time is 30 min, and the ball milling reaction temperature is controlled at 130° C.;
(7) supplement NaOH into the filtrate obtained in step (1), till the NaOH concentration in the filtrate reaches 105% of the concentration before the contact, to enable the sodium sulfate in the filtrate to precipitate, and then carry out solid-liquid separation. 3 kg sodium sulfate crystals of 98.5% purity are obtained through solid-liquid separation, while a part of sodium sulfate remains in the NaOH desulfurizing liquid. After concentration adjustment, the NaOH solution can be reused in step (1).

After drying, the recovered PbO sample is weighed 6.95 Kg; an ICP test indicates that the purity is 99.99%, an XRD test indicates that the α-PbO content is 95%; with the PbO that remains in the NaOH mother liquid in step (5) taken into account, the PbO recovery rate is 99.7%.

Example 2

This example is provided to explain the method in the present invention, in which the NaOH mother liquid obtained in step (4) and the NaOH desulfurization liquid in step (7) after a first cycle of lead oxide recovery from waste lead paste in lead-acid batteries of electric vehicles in Example 1 are used in a second cycle to recover PbO.

Weigh another 10 kg waste lead paste that is the same as the waste lead paste in Example L The cyclic PbO recovery process is as follows:
(1) mix the waste lead paste obtained from lead-acid batteries with the 8.9 wt % NaOH solution obtained in step (7) in Example 1 and carry out ball milling (based on 1,000 g waste lead paste, the mass of the balls is 130 g, agate balls are used) for 30 min, and then filter to obtain filtrate and filter residue;
(2) mix the filter residue with 500 g promoter for atom-economic reaction of 200 meshes (the weight ratio of Pb powder to β-$PbO_2$ is 1:2) to a homogeneous state, and heat up the mixture to 530° C. using a temperature programming method with a heating rate of 10° C./min, keep the reaction for 10 min at 530° C. temperature, to enable the reaction to be carried out homogeneously and fully;
(3) cool the product obtained in step (2) by water mist cooling (the size of water mist droplets is 10 μm) to 120° C., and stop water spraying at that temperature;
(4) control the cooled product obtained in step (3) to contact with the 35 wt % NaOH mother liquid recovered in Example 1, keep the temperature at 125° C., and stir for 10 min at 120 rpm speed, to enable the PbO obtained in step (3) to be fully dissolved in the NaOH mother liquid;
(5) control the filtrate obtained through solid-liquid separation in step (4) to crystallize for 40 min and 300 min at 75° C. and 10° C. respectively, and then carry out solid-liquid separation to obtain PbO crystals and NaOH mother liquid, wherein, the NaOH mother liquid contains 22 g/L PbO, and 70 g water is added to the NaOH mother liquid, so that the NaOH concentration is recovered to the initial concentration; then, the NaOH liquid is reused in step (4);
(6) treat the PbO crystals obtained in step (5) by ball milling in a ball mill for crystal transformation, wherein, the crystal transformation conditions include: based on 1,000 g lead oxide-containing waste, the mass of the balls is 300 g, the number of the balls is 20, the ball milling time is 100 min, and the ball milling reaction temperature is controlled at 60° C.;
(7) supplement NaOH into the filtrate obtained in step (1), till the NaOH concentration in the filtrate reaches 115% of the concentration before the contact, to enable the sodium sulfate in the filtrate to precipitate, and then carry out solid-liquid separation. After solid-liquid separation, 3.4 Kg sodium sulfate crystals of 99.0% purity is obtained, and the recovery rate of sodium sulfate is 95%; after the product is dried at 150° C. for 1 h, and then weighed and analyzed by ICP, the product is 8.4 Kg PbO of 99.99% purity, and an XRD test indicates the product contains 90% α-PbO, and the lead recovery rate is 99.8%.

Example 3

Take 1 Kg waste lead paste obtained from lead-acid batteries. Through analysis, the major components in the waste lead paste are: 13 wt % Pb, 18 wt % PbO, 33 wt %

PbO$_2$, 35 wt % PbSO$_4$, and 0.3 wt % BaSO$_4$, and the remaining part is water. The waste lead paste is equivalent to 3.97 mol PbO, and the cyclic PbO recovery process is as follows:

(1) mix the waste lead paste with 1.3 L 10 wt % NaOH solution, and carry out ball milling (based on 1,000 g waste lead paste, the mass of the balls is 200 g, agate balls are used) for 20 min, and then filter to obtain filtrate and filter residue;

(2) mix the filter residue with promoter for atom-economic reaction of 300 meshes (the weight ratio of carbon powder to β-PbO$_2$ is 1:1) to a homogeneous state, and heat up the mixture to 570° C. using a temperature programming method with a heating rate of 10° C./min, keep the reaction for 5 min at the temperature while turning over, to enable the reaction to be carried out homogeneously and fully, wherein, the dosage of the promoter for atom-economic reaction is 1 wt % of the filter residue;

(3) cool the product obtained in step (2) by water mist cooling (the size of water mist droplets is 30 μm) to 110° C. within 6 min, and stop water spraying at that temperature;

(4) control the cooled product in step (3) to contact with 9 L 25 wt % NaOH solution and ethylene diamine, heat up the mixture to 115° C., stir at 60 rpm speed at the temperature for 10 min, to dissolve the PbO; then, carry out solid-liquid separation, wherein, the weight ratio of NaOH solution to ethylene diamine is 1:0.05;

(5) control the filtrate obtained through solid-liquid separation in step (4) to crystallize for 60 min and 350 min at 70° C. and 10° C. respectively, to obtain PbO crystals and crystallized mother liquid, reuse the crystallized mother liquid obtained in step (5) in step (4);

(6) treat the PbO crystals obtained in step (5) by ball milling in a ball mill for crystal transformation, wherein, the crystal transformation conditions include: based on 1,000 g lead oxide-containing waste, the mass of the balls is 80 g, the number of the balls is 20, the ball milling time is 10 min, and the ball milling reaction temperature is controlled at 80° C.;

(7) supplement NaOH into the filtrate obtained in step (1), till the NaOH concentration in the filtrate reaches 110% of the concentration before the contact, to enable the sodium sulfate in the filtrate to precipitate, and then carry out solid-liquid separation. After solid-liquid separation, 290 g sodium sulfate crystal product of 99.0% purity is obtained, while the residual sodium sulfate remains in the desulphurization mother liquid and can accumulate and precipitate in subsequent desulphurization cycles. The liquid is NaOH solution, and the NaOH desulphurization mother liquid can be reused in step (1) after concentration adjustment.

790 g PbO is obtained in the experiment. Through ICP analysis, the purity is 99.99%, and an XRD test indicates that the content of α-PbO is 85%. Deducting the 93 g PbO dissolved in the NaOH solution in step (5), the recovery rate is 790/(3.97*223−93)=99.7%.

Example 4

The lead oxide in the waste lead paste is recovered with the method in Example 3, and the NaOH mother liquid obtained in step (5) and the desulphurization mother liquid obtained in step (7) in Example 3 are used cyclically, except that the promoter for atom-economic reaction is lead powder. Finally, 884 g PbO is obtained; an ICP test indicates that the purity is 99.99%, and an XRD test indicates that the content of α-PbO is 86%, and the PbO recovery rate is 99.8%.

Example 5

The lead oxide in the waste lead paste is recovered with the method in Example 3, and the NaOH mother liquid obtained in step (5) and desulphurization mother liquid obtained in step (7) in Example 4 are reused respectively, except that the temperature in step (2) is 500° C. Finally, 883 g PbO is obtained, the purity is 99.99%, and an XRD test indicates that the content of α-PbO is 89%, and the PbO recovery rate is 99.7%.

Example 6

The lead oxide in the waste lead paste is recovered with the method in Example 3, and the NaOH mother liquid obtained in step (5) and desulphurization mother liquid obtained in step (7) in Example 5 are reused respectively, except that the temperature in step (2) is 600° C. Finally, 880 g PbO is obtained, the purity of the product is 99.95%, and an XRD test indicates that the content of α-PbO is 80%, and the PbO recovery rate is 99.4%.

Example 7

The lead oxide in the waste lead paste is recovered with the method in Example 3, and the NaOH mother liquid obtained in step (5) and desulphurization mother liquid obtained in step (7) in Example 6 are reused respectively, except that the product obtained in step (2) is cooled to 100° C. quickly within 1 min in step (3). Finally, 881 g PbO is obtained, the purity of the product is 99.97%, and an XRD test indicates that the content of α-PbO is 85%, and the PbO recovery rate is 99.5%.

Example 8

Take another 1 kg waste lead paste that is the same as the waste lead paste in Example 3. The waste lead paste is equivalent to 3.97 mol PbO, and the PbO recovery process is as follows:

(1) mix the waste lead paste with 1.3 L 12 wt % KOH solution and carry out ball milling at 130% stoichiometric ratio (based on 1,000 g waste lead paste, the mass of the balls is 200 g, agate balls are used) for 20 min, and then filter to obtain filtrate and filter residue;

(2) mix the filter residue with promoter for atom-economic reaction of 300 meshes (the weight ratio of carbon powder to β-PbO$_2$ is 1:1) to a homogeneous state, and heat up the mixture to 570° C. using a temperature programming method with a heating rate of 10° C./min, keep the reaction for 5 min at the temperature while turning over, to enable the reaction to be carried out homogeneously and fully, wherein, the dosage of the promoter for atom-economic reaction is 1 wt % of the filter residue;

(3) cool the product obtained in step (2) by water mist cooling (the size of water mist droplets is 30 μm) to 110° C. within 6 min, and stop water spraying at that temperature;

(4) control the cooled product in step (3) to contact with 9 L 33 wt % KOH solution and xylitol, heat up the mixture to 122° C., stir at 60 rpm speed at the temperature for 10 min, to dissolve the PbO; then, carry out solid-liquid separation, wherein, the weight ratio of KOH solution to xylitol is 1:0.02;

(5) control the filtrate obtained through solid-liquid separation in step (4) to crystallize for 60 min and 360 min at 65° C. and 5° C. respectively, to obtain PbO crystals and crystallized mother liquid, reuse the crystallized mother liquid obtained in step (5) in step (4);
(6) treat the PbO crystals obtained in step (5) by ball milling in a ball mill for crystal transformation, wherein, the crystal transformation conditions include: based on 1,000 g lead oxide-containing waste, the mass of the balls is 80 g, the number of the balls is 20, the ball milling time is 10 min, and the ball milling reaction temperature is controlled at 80° C.;
(7) supplement KOH into the filtrate obtained in step (1), till the KOH concentration in the filtrate reaches 105% of the concentration before the contact, to enable the potassium sulfate in the filtrate to precipitate, and then carry out solid-liquid separation. After solid-liquid separation, 160 g potassium sulfate crystal product of 99.2% purity is obtained, while the residual potassium sulfate remains in the desulphurization mother liquid and can accumulate and precipitate in subsequent desulphurization cycles. The liquid obtained after potassium sulfate precipitates is KOH solution, and the KOH desulphurization mother liquid can be reused in step (1) after concentration adjustment.

802 g PbO is obtained in the experiment. Through ICP analysis, the purity is 99.99%, and an XRD test indicates that the content of α-PbO is 83%. Deducting the 81 g PbO dissolved in the KOH solution in step (5), the recovery rate is 802/(3.97*223−81)=99.7%.

Example 9

The lead oxide-containing waste used in this example is lead oxide-containing waste from Henan Jiyuan Smelting Plant. Through analysis, the major components in the lead oxide-containing waste include: 65 wt % PbO, 24 wt % $PbSO_4$, and the remaining part consists of insoluble impurities, including 4 wt % $CaSiO_3$, 5 wt % $Al_2O_3$, and 2 wt % $SiO_2$, etc. Weigh 1 Kg lead oxide-containing waste, which is equivalent to 826.6 g PbO. The lead oxide recovery process is as follows:
(1) mix and stir the lead oxide-containing waste with 0.9 L 10 wt % NaOH solution at 150% stoichiometric ratio in a reactor for desulphurization. Stir at 60 rpm for 20 min, and then filter to obtain filtrate and filter residue;
(2) heat up the filter residue to 520° C. using a temperature programming method with a heating rate of 10° C./min, keep the reaction at 520° C. for 55 min, to ensure the reaction to be carried out homogeneously and fully;
(3) cool the product obtained in step (2) by ethanol mist cooling (the size of mist droplets is 30 μm) to 100° C. within 6 min, and stop mist spraying at that temperature;
(4) control the cooled product in step (3) to contact with 10 L 33 wt % NaOH solution (with dissolved PbO, and the PbO concentration is 30 g/L) and xylitol, wherein, the weight ratio of NaOH solution to xylitol is 1:0.02; heat up the mixture to 125° C., stir at 60 rpm speed at the temperature for 10 min, to promote the PbO in the product obtained in step (3) to be dissolved; then, carry out solid-liquid separation;
(5) control the filtrate obtained through solid-liquid separation in step (4) to crystallize for 60 min and 350 min at 70° C. and 8° C. respectively, to obtain PbO crystals and crystallized mother liquid; reuse the crystallized mother liquid obtained in step (5) in step (4);
(6) treat the PbO crystals obtained in step (5) by ball milling in a ball mill for crystal transformation, wherein, the crystal transformation conditions include: based on 1,000 g lead oxide-containing waste, the mass of the balls is 80 g, the number of the balls is 20, the ball milling time is 10 min, and the ball milling reaction temperature is controlled at 100° C.;
(7) supplement NaOH into the filtrate obtained in step (1), till the NaOH concentration in the filtrate reaches 102% of the concentration before the contact, to enable the sodium sulfate in the filtrate to precipitate, and then carry out solid-liquid separation. After solid-liquid separation, 140 g sodium sulfate crystal product of 99.2% purity is obtained, while the residual sodium sulfate remains in the desulphurization mother liquid and can accumulate and precipitate in subsequent desulphurization cycles. The liquid obtained after sodium sulfate precipitates is NaOH solution, and the NaOH solution can be reused in step (1) after concentration adjustment.

Through the ball milling process for crystal transformation in step (6), 825.1 g PbO is obtained. Through ICP analysis, the purity is 99.99%, an XRD indicates that the content of α-PbO is 80%, and the recovery rate is 825.1/826.6=99.8%.

Preferred embodiments of the present invention are described above in detail, however, the present invention is not limited to the specific details of the above embodiments, technical solutions of the present invention may have various simple modifications within the technical spirit of the present invention, and these simple modifications belong to the scope of the present invention.

In addition, it should be noted that each specific technical characteristic described in the above specific embodiments can be combined in any suitable manner, without contradictory situation. In order to avoid unnecessary repetition, various possible combinations are not further explained in the present invention.

Moreover, various embodiments of the present invention may also be combined in any suitable manner, as long as it will not depart from the idea of the present invention, and the combinations should be regarded as the disclosure of the present invention.

The invention claimed is:
1. A method for recovering lead oxide from lead oxide-containing wastes, comprising the following steps:
  (1) controlling a lead oxide-containing waste to contact with a desulfurizing agent to desulfurize through wet ball milling, and carrying out solid-liquid separation for a mixture obtained from the contact, to obtain filtrate and filter residue;
  (2) controlling the filter residue to have a conversion reaction at 350-750° C. temperature, to convert lead-containing components in the filter residue into PbO;
  (3) controlling a product obtained in step (2) to contact with alkaline solution A, to dissolve the PbO in the product, and then carrying out solid-liquid separation to obtain PbO-alkaline solution;
  (4) controlling the PbO-alkaline solution obtained in step (3) to crystallize, to obtain PbO crystals and alkaline filtrate;
    wherein the contact in step (3) is carried out in presence of a dissolution promoter, which is selected from the group consisting of ethylene diamine, sodium acetate, sodium tartrate, EDTA, glycerol, butanediol, pentanol, sorbitol, xylitol, histidine, arginine, and glycocoll; and the dosage of the dissolution promoter is 0.2-20 wt % of the alkaline solution A.
2. The method according to claim 1, wherein the conversion reaction in step (2) is carried out in the presence of a promoter, which is added in step (1) and/or step (2).
3. The method according to claim 2, wherein the promoter is selected from the group consisting of lead powder, barium powder, aluminum powder, sodium powder, lithium powder, potassium powder, magnesium powder, naphthalene, cam- phor, urea, nickel powder, tin powder, stibium powder, zinc powder, carbon powder, active carbon containing 0.5-95 wt % PbO, and a mixture of above-mentioned substances with β-lead peroxide mixed at any mix ratio.

4. The method according to claim 3, wherein the dosage of the promoter is 0.05-30 wt % of the filter residue obtained in step (1).

5. The method according to claim 1, further comprising: cooling a product obtained in step (2) to 100-300° C. during a period of 0.5-30 min before performing step (3).

6. The method according to claim 5, wherein the cooling is carried out in a manner of liquid mist cooling.

7. The method according to claim 1, wherein the alkaline solution A used in step (3) is either or both of sodium hydroxide solution and potassium hydroxide solution, the concentration of the alkaline solution A is 12-60 wt %, and the dosage of the alkaline solution A ensures that the concentration of a product obtained in step (2) used in the contact in step (3) is 30-120 g/L, the contact temperature in step (3) is 45-135° C., and the contact time in step (3) is 0.5-100 min.

8. The method according to claim 1, wherein in step (4), a crystallization process is carried out in stages, including: a first stage of crystallization at 60-135° C. and a second stage of crystallization at −5° C. to 60° C., wherein, the duration of the first stage of crystallization is 1-60 min, the duration of the second stage of crystallization is 3-600 min.

9. The method according to claim 1, further comprising:
(5) treating the PbO crystals obtained in step (4) by ball milling for crystal transformation, to obtain PbO in α-structure.

10. The method according to claim 9, wherein the conditions of ball milling for crystal transformation include: based on 1,000 g lead oxide, the mass of the balls is 5-500 g, the number of the balls is 5-100, the ball milling time is 0.1-200 min, and the temperature is 5-550° C.

11. The method according to claim 1, further comprising: substituting a product obtained in step (2) with the PbO crystal obtained in step (4) and repeating step (3) and step (4) cyclically.

12. The method according to claim 1, wherein the contact between the lead oxide-containing waste and the desulfurizing agent is implemented through a wet ball milling and mixing process.

13. The method according to claim 1, wherein in step (1), the desulfurizing agent is NaOH and/or KOH solution, and the concentration of the NaOH and/or KOH solution is 4-23 wt %.

14. The method according to claim 5, wherein cooling a product obtained in step (2) to 100-150° C. during a period of 1-10 min, before performing step (3).

15. The method according to claim 6, wherein a coolant of the cooling is one or more of water, methanol, ethanol, and acetone.

16. The method according to claim 6, wherein the size of mist droplets is 2-50 μm.

17. The method according to claim 5, further comprising: substituting a product obtained in step (2) with the PbO crystal obtained in step (4) and repeating step (3) and step (4) cyclically.

18. The method according to claim 9, further comprising: substituting a product obtained in step (2) with the PbO crystal obtained in step (4) and repeating step (3) and step (4) cyclically.

* * * * *